(12) United States Patent
Millhouse et al.

(10) Patent No.: US 11,151,679 B2
(45) Date of Patent: Oct. 19, 2021

(54) SYSTEMS AND METHODS FOR MONITORING PACKAGING QUALITY ISSUES

(71) Applicant: Walmart Apollo, LLC, Bentonville, AR (US)

(72) Inventors: Andrew B. Millhouse, Gilbert, AZ (US); Steven J. Lewis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 351 days.

(21) Appl. No.: 15/820,834

(22) Filed: Nov. 22, 2017

(65) Prior Publication Data
US 2018/0144430 A1    May 24, 2018

Related U.S. Application Data

(60) Provisional application No. 62/425,192, filed on Nov. 22, 2016.

(30) Foreign Application Priority Data

Apr. 25, 2017 (CA) ..................... 2965218

(51) Int. Cl.
G06Q 50/00 (2012.01)
G06Q 10/00 (2012.01)
(Continued)

(52) U.S. Cl.
CPC ....... G06Q 50/28 (2013.01); G06Q 10/06395 (2013.01); G06Q 50/2057 (2013.01)

(58) Field of Classification Search
USPC .............................. 705/7.11–7.42
See application file for complete search history.

(56) References Cited

U.S. PATENT DOCUMENTS 6,405,175 B1   6/2002 Ng
8,095,395 B2 * 1/2012 Cunniff ............... G06Q 20/203
                                                        705/4

(Continued)

OTHER PUBLICATIONS

Pot; App. No. PCT/US2017/062511; International Search Report and Written Opinion mailed Feb. 2, 2018; Docket No. 8842-138948-Wo.

(Continued)

*Primary Examiner* — Alan S Miller
*Assistant Examiner* — Mustafa Iqbal
(74) *Attorney, Agent, or Firm* — Fitch, Even, Tabin & Flannery LLP (57) ABSTRACT

In some embodiments, apparatuses and methods are provided herein useful to monitoring the quality of packages loaded onto delivery vehicles for delivery to customers. In some embodiments, there is provided a system including: a database receiving and storing package quality reports in which each report corresponds to the transport of packages by a delivery vehicle to a customer; at least one package quality report including: delivery route identification information, and package quality feedback information identifying package quality conditions of packages transported by the delivery vehicle from a group of package quality conditions; and a control circuit configured to: allow a first group of users to access the package quality reports received and stored in the database, and allow a second group of users to each transmit and store a new package quality report in the database but not to access the package quality reports previously received and stored.

15 Claims, 5 Drawing Sheets

(51) Int. Cl.
    *G06Q 50/28*     (2012.01)
    *G06Q 10/06*     (2012.01)
    *G06Q 50/20*     (2012.01)

(56) References Cited

U.S. PATENT DOCUMENTS

| | | | |
|---|---|---|---|
| 8,271,336 B2 | 9/2012 | Mikurak | |
| 8,615,473 B2 | 12/2013 | Spiegel | |
| 8,918,340 B2 | 12/2014 | Kadaba | |
| 2003/0190057 A1* | 10/2003 | Takehara | B66C 19/007 |
| | | | 382/104 |
| 2006/0109964 A1 | 5/2006 | Skelton | |
| 2009/0281929 A1* | 11/2009 | Boitet | G06Q 10/08 |
| | | | 705/28 |
| 2010/0262521 A1* | 10/2010 | Robinson | G06Q 10/08 |
| | | | 705/29 |
| 2011/0288896 A1* | 11/2011 | Dewey, Jr. | G06Q 10/0631 |
| | | | 705/7.12 |
| 2012/0284083 A1* | 11/2012 | Wu | G06Q 10/08 |
| | | | 705/7.31 |
| 2013/0066669 A1* | 3/2013 | Stevens | G06Q 10/04 |
| | | | 705/7.14 |
| 2013/0098989 A1* | 4/2013 | Salzman | G06Q 50/28 |
| | | | 235/375 |
| 2015/0006005 A1* | 1/2015 | Yu | G05D 1/0297 |
| | | | 701/22 |
| 2015/0046298 A1* | 2/2015 | Zwakhals | G06Q 10/087 |
| | | | 705/28 |
| 2015/0073936 A1 | 3/2015 | Peterson | |
| 2016/0019497 A1 | 1/2016 | Carvajal | |
| 2016/0167227 A1* | 6/2016 | Wellman | B25J 9/1612 |
| | | | 700/259 |
| 2016/0187315 A1 | 6/2016 | Blumenfeld | |
| 2018/0012158 A1* | 1/2018 | Cholewinski | G06Q 10/087 |
| 2018/0038805 A1* | 2/2018 | Heikkila | G06T 7/001 |
| 2018/0107967 A1* | 4/2018 | Bulcao | G06Q 50/28 |

OTHER PUBLICATIONS

Tsadmin; "Truckin' Biz Tips"; Truckin' Biz Tips 1Trip Sheet Central; https://www.tripsheetcentral.com/cat/truckingbusinesstips/; pp. 1-17.

\* cited by examiner

SYSTEMS AND METHODS FOR MONITORING PACKAGING QUALITY ISSUES

CROSS-REFERENCE TO RELATED APPLICATION

This application claims the benefit of U.S. Provisional Application No. 62/425,192, filed Nov. 22, 2016, and Canadian Application No. 2,965,218, filed Apr. 25, 2017, which are all incorporated by reference in their entirety herein.

TECHNICAL FIELD

This invention relates generally to monitoring packaging quality issues of packages being delivered to customers, and more particularly, to monitoring the quality of packages received by carriers from e-commerce facilities for delivery to customers.

BACKGROUND

In the retail setting, the role of e-commerce is becoming increasingly significant. Customers are increasingly placing orders online from the comfort of their homes (or other convenient locations) via a retailer's website. The ordered merchandise can then be collected at an e-commerce facility of the retailer and can be delivered to the customer's residence or other desired address. In this manner, the customer can conveniently make his or her purchases without having to devote time and effort to physically traveling to a store to look for the desired merchandise.

Frequently, these deliveries may be made by third party carriers. In this context, it is desirable to make sure that packages containing the merchandise are in proper form. In other words, it is desirable to make sure that the packages being provided by the e-commerce facility to the carriers are not damaged, have missing or unreadable labels, or are improperly taped or packed. Accordingly, it would be desirable to develop some approach in which the carriers could provide feedback to the retailer regarding the quality of the packages provided to them for delivery to customers.

BRIEF DESCRIPTION OF THE DRAWINGS

Disclosed herein are embodiments of systems, apparatuses and methods pertaining to monitoring the quality of packages received by carriers for delivery to customers. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to monitoring the quality of packages loaded onto delivery vehicles for delivery to customers. In some embodiments, there is provided a system for, the system including: a database configured to receive and store a plurality of package quality reports, each report corresponding to transport of packages by a delivery vehicle to a customer; at least one package quality report including: delivery route identification information, and package quality feedback information identifying at least one package quality condition of at least one of the packages transported by the delivery vehicle from a plurality of predetermined categories; and a control circuit operatively coupled to the database, the control circuit configured to: allow a first predetermined group of users to access the plurality of package quality reports received and stored in the database, and allow a second predetermined group of users to each transmit and store a new package quality report in the database but not to access the plurality of package quality reports previously received and stored in the database.

In one form, in the system, the database may include a cloud-based database communicatively coupled to a website server configured to serve as a platform for the input of the identification information and package quality feedback information to the database. Further, the website server may be configured to be in wireless communication with a plurality of computing devices, each computing device used by one of the second predetermined group of users to input and transmit the identification information and package quality feedback information. Also, in the system, the at least one package quality condition from a plurality of predetermined categories may include a package intended for a different delivery vehicle, a package with a missing label, a package with a damaged or unreadable label, a mislabeled or re-labeled package, an improperly taped or packed package, and a damaged package. In addition, the at least one package quality control report may include a total number of packages on a delivery vehicle and a number of packages with each of the least one package quality condition from the plurality of predetermined categories.

In one form, the packages transported by each delivery vehicle may be supplied by an e-commerce facility to a package shipping center for shipping to a customer. Further, the control circuit may be configured to transmit the at least one package quality report to the e-commerce facility that supplied the packages that are the subject of the report to the package shipping center. Moreover, the control circuit may be configured to determine corrective action by the e-commerce facility or the package shipping center to address a particular package quality condition including at least one of employee training and revision of a packaging process.

In one form, in the system, the at least one package quality report further may include information regarding how the packages were loaded and arranged in the interior of a delivery vehicle. Also, the information may include at least one of load stacking, load packing, arrangement and location of the load in the delivery vehicle, pallet information, damage to the load, and temperature information. In addition, the information may include at least one load quality condition from a plurality of predetermined categories including a good load, a tipped or unstable pallet, an improperly stacked container, a pallet near an end of a delivery vehicle, a load against a door of a delivery vehicle, late delivery, a delivery vehicle making multiple deliveries, or cross-contamination of merchandise. Further, the at least one package quality report may include an image of at least one of a package with a condition from one of the plurality of predetermined categories or the interior of the delivery vehicle showing loading and arrangement of the packages.

In another form, there is provided a method for monitoring quality of packages loaded onto vehicles for delivery to customers, the method including: by a database, receiving and storing a plurality of package quality reports, each report corresponding to transport of packages by a delivery vehicle to a customer, at least one package quality report including: delivery route identification information, and package quality feedback information identifying at least one package quality condition of at least one of the packages transported by the delivery vehicle from a plurality of predetermined categories; and by a control circuit: allowing a first predetermined group of users to access the plurality of package quality reports received and stored in the database; and allowing a second predetermined group of users to each transmit and store a new package quality report in the database but not to access the plurality of package quality reports previously received and stored in the database.

Figure 1:
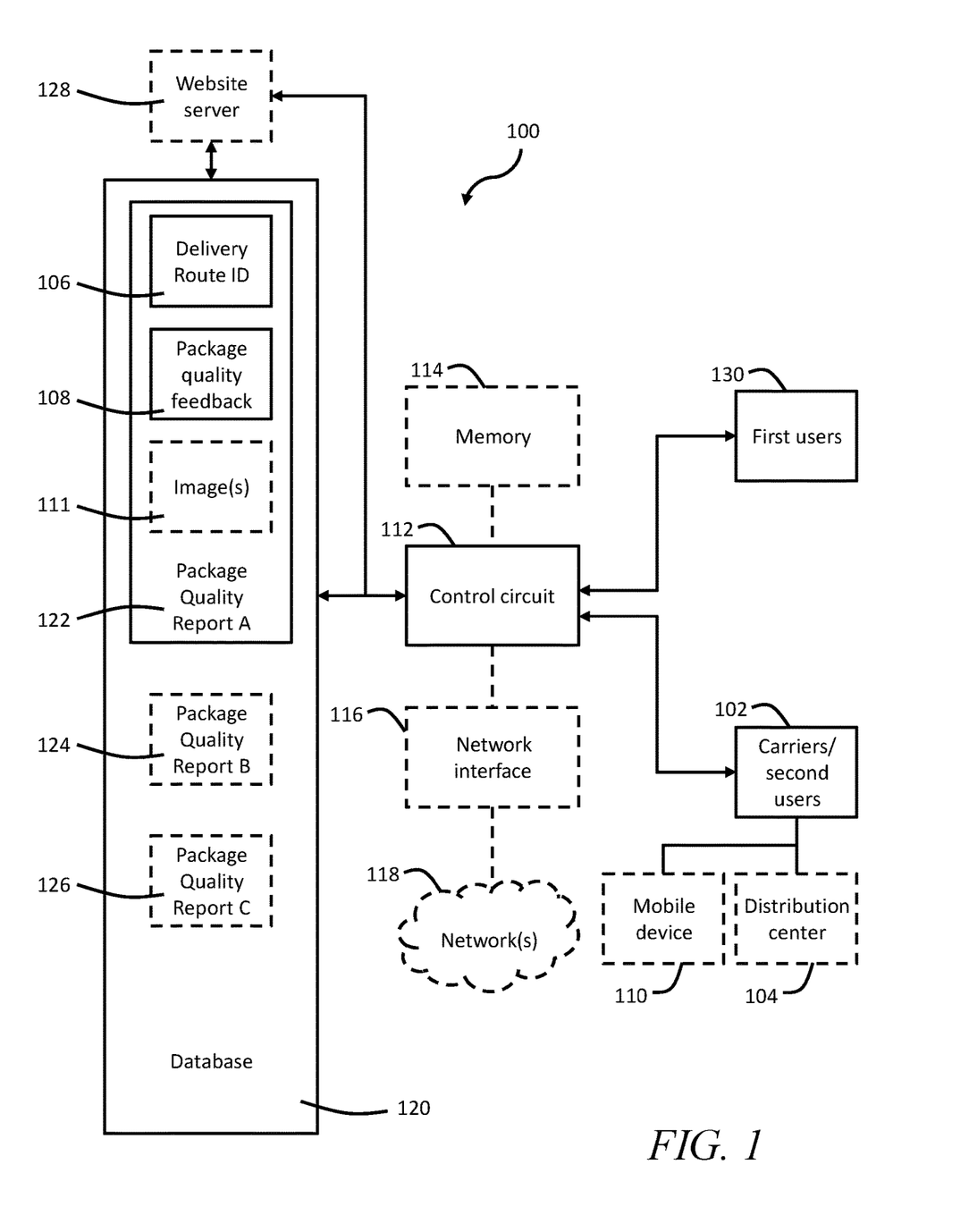
FIG. 1 is a block diagram in accordance with some embodiments.

Referring to FIG. 1, there is shown a block diagram illustrating components of a system 100. As addressed below, in one form, carriers may input information regarding the quality and conditions of packages they are picking up and transporting to customers, including delivery route identification information and feedback regarding package quality. In one form, carriers may submit this information on mobile devices via a web-based form. These package quality reports are communicated to a database where they may be used to provide feedback and correct potential poor packaging conditions in future deliveries.

In the system 100, in one form, it is generally contemplated that packages may be picked up by carriers/second users 102 at a merchandise distribution center 104. In one form, these carriers 102 may be third party carriers (such as parcel carriers), who may be contracted by a retailer to provide delivery services ("last mile" deliveries) to the end users or customers. Alternatively, these carriers 102 may be employed by the retailer as drivers of delivery vehicles. Further, in one form, the merchandise distribution center 104 may (but need not) constitute an e-commerce facility and may be devoted, in whole or in part, to e-commerce deliveries to customers. In addition, in one form, the packages may be delivered initially from a distribution center 104 to a package shipping center (either by a retailer or third party carrier), where they may then be sorted, arranged, and/or transported to customers.

In the system 100, it is generally contemplated that the carriers 102 may provide feedback regarding the quality of the packages that they are picking up for delivery to customers. In one form, it is contemplated that the carriers 102 may input and transmit package quality report(s) at or around the time of pick up of the packages. The package quality report(s) correspond generally to the transport of package(s) by delivery vehicle(s) to customer(s). These package quality report(s) include: delivery route identification information 106 (so as to be able to identify and track the packages for which feedback is being provided), and package quality feedback information 108. It is generally contemplated that this package quality feedback information 108 will identify package quality condition(s) of the package (s) being transported by the carrier 102 from a list of common package quality conditions. In one form, as discussed further below, the carrier 102 may access a customized web-based form with a drop down list of specific types of package quality conditions.

In one form, it is contemplated that the carrier 102 may input and transmit this information using a mobile device 110. In other words, the carrier 104 may inspect and memorialize the package quality conditions using a mobile device 110. It is contemplated that any of various types of mobile devices may be used, such as smartphones and other portable computing devices (including MC40 handheld devices, tablets, and laptops). The carrier 102 may perform this inspection at or about the time of the transfer of the packages to the carrier 102 or may do so at a later time, such as at a package shipping center.

In one form, it is contemplated that the carrier 102 may input three types of information using the mobile device 110. First, the carrier 102 may input delivery identification information 106. For example, it is generally contemplated that the carrier 102 may input a unique number or code identifier corresponding to the specific route (corresponding to date and/or time) of the delivery vehicle. Each delivery may therefore have a specific, unique number or code. As another example, however, it may be desirable to simply track deliveries by the source (such as a distribution center), by specific carrier, or by the batch of packages being picked up at the distribution center 104 and transferred to a package shipping center. In other words, it may be sufficient to identify groups of packages being shipped by a specific source, received by a specific carrier 102, or received at an intermediate destination (without the need for the detailed tracking of each individual package to a customer).

Second, the carrier 102 may input package quality feedback information 108 relating to package(s) and/or deliveries. This feedback information 108 may include various types of packing and labeling issues. For example, this feedback information 108 may include and identify the number of packages with missing labels, packages with damaged or unreadable labels, mislabeled or re-labeled packages, improperly taped or packed packages, and damaged packages.

Third, optionally, the carrier 102 may use a camera or other optical device to collect images 111 of the package(s). In one form, it is contemplated that the camera is an integrated part of the mobile device 110, i.e., the mobile device 110 has a built-in camera. However, in another form, it is possible that the camera may be a discrete device (a separate mobile device) that is not part of the mobile device 110. The camera may be utilized to take still images/video 111 of package(s). As should be evident, the image(s) 111 provide a very accurate record of the quality of the packages at the time they are being arranged for delivery to customers.

The system 100 also includes a control circuit 112 that generally controls the operation of the system 100. Being a "circuit," the control circuit 112 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 112 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 112 is configured (for example, by using corresponding programming as will be well understood by those skilled in the art) to carry out one or more of the steps, actions, and/or functions described herein.

By one optional approach, the control circuit 112 operably couples to a memory 114. This memory 114 may be integral to the control circuit 112 or can be physically discrete (in whole or in part) from the control circuit 112, as desired. This memory 114 can also be local with respect to the control circuit 112 (where, for example, both share a common circuit board, chassis, power supply, and/or housing) or can be partially or wholly remote with respect to the control circuit 112 (where, for example, the memory 114 is physically located in another facility, metropolitan area, or even country as compared to the control circuit 112).

This memory 114 can serve, for example, to non-transitorily store the computer instructions that, when executed by the control circuit 112, cause the control circuit 112 to behave as described herein. As used herein, this reference to "non-transitorily" will be understood to refer to a non-ephemeral state for the stored contents (and hence excludes when the stored contents merely constitute signals or waves), rather than volatility of the storage media itself, and hence includes both non-volatile memory (such as read-only memory (ROM)) as well as volatile memory (such as an erasable programmable read-only memory (EPROM).)

In this example, the control circuit 112 also operably couples to a network interface 116. So configured, the control circuit 112 can communicate with other elements (both within the system 100 and external thereto) via the network interface 116. Network interfaces, including both wireless and non-wireless platforms, are well understood in the art and require no particular elaboration here. This network interface 116 can compatibly communicate via whatever network or networks 118 may be appropriate to suit the particular needs of a given application setting. Both communication networks and network interfaces are well understood areas of prior art endeavor and therefore no further elaboration will be provided here in those regards for the sake of brevity.

In one form, the system 100 includes a database 120 (coupled to the control circuit 112) that may receive and store the delivery identification information 106, package quality feedback information 108, and image(s) 111. As described above, each package quality report may correspond to the transport of package(s) by delivery vehicle(s) to customer(s). FIG. 1 specifically shows three package quality reports in the database 120 (Package Quality Report A (122), Package Quality Report B (124), Package Quality Report C (126)), but it should be evident that the database 120 will likely include many more package quality reports (so as to provide meaningful data for the system 100).

Further, components of the system 100 may be combined in various ways. For example, the mobile device 110, control circuit 112, and database 120 may form part of one unitary structural body. In this example, the delivery identification information 106, package quality feedback information 108, and image(s) 111 may be stored locally in the mobile device 110. This information may then be downloaded or otherwise transmitted from the database 120 after the package inspection has been completed.

However, in another form, the control circuit 112 may be in wireless communication with a website server 128, or central computing device, which may enable access to and communication with a database 120, which is remote from the mobile device 110. For example, as described above, the website may utilize a customized form in which various fields may be populated and/or drop down menus may be used to input the delivery identification information 106 and the package quality feedback information 108. Further, the website may facilitate attachment of the image(s) 111 of the packages. This information may then be transmitted as feedback to other individuals and groups and appropriate action may be taken to seek to address and improve the package quality conditions. In one form, it is contemplated that the system 100 may use a cloud-based database 120 and website platform. In other words, the database 120 may include a cloud-based database communicatively coupled to a website server 128 configured to serve as a platform for the input of the identification information 106 and package quality feedback information 108 (and optionally image(s) 111) to the database 120.

In the system 100, in one form, it is contemplated that two different user groups will have different access rights to the package quality information in the database 120. More specifically, the control circuit 112 allows a first group of users 130 to generally access most or all of the package quality report(s) received and stored in the database 120. For example, this access might be useful for an e-commerce facility home office to freely evaluate the package quality issues raised by the package quality report(s). In contrast, the control circuit 112 allows a second group of users (i.e., third party carriers 102) to each transmit and store a new package quality report in the database 120 but not to have access to the other package quality report(s) previously received and stored in the database 120. The second group of users 102 may input and transmit identification information 106 and package quality feedback information 108, and in one form, the website server 128 may be in wireless communication and receive package quality report(s) from mobile devices 110 and other computing devices of the second group of users 102.

As described above, in one form, it is contemplated that the packages transported by the carriers 102 are supplied by an e-commerce facility/distribution center 104 to an intermediate package shipping center for shipping to the customers/end users. It is further contemplated that the package quality report(s) are transmitted to or accessible by an e-commerce facility (such as a home office). In other words, the control circuit 112 may cause the transmission of the package quality report(s) to the e-commerce facility that supplied the packages that are the subject of the report(s). Based on the package quality report(s), corrective action may then be determined to address package quality problems. In other words, the control circuit 112 may determine corrective action by the e-commerce facility or the package shipping center to address a particular package quality condition, and this corrective action may include employee training and/or revision or modification of a packaging process.

The system 100 described above has generally addressed package quality reports identifying package quality condition of packages transported by delivery vehicles. However, in another form, it is also contemplated that the approach may simultaneously (or close in time) include monitoring the loading conditions of a delivery vehicle that may be transporting the packages. In one form, this approach may provide a low-cost approach in which some description and image(s) of the interior of the delivery vehicle are generated to show loading and stacking conditions (in addition to information and images that may be directed to specific package quality conditions). This approach may allow carriers 102 to submit real-time feedback of both load and package conditions via mobile devices 110 through forms and images. This information can then be communicated to various individuals, groups, and database(s) 120 within the distribution chain to provide feedback about the loading and package conditions and to allow them to be improved for future deliveries.

The reports may include information regarding both the packaging (packing, labeling, etc.) and the loading of packages in delivery vehicles. In other words, the package quality report(s) may include information regarding how the packages were loaded and arranged in the interior of a delivery vehicle, as well as the packaging itself. Further, this loading information may generally include load stacking, load packing, arrangement and location of the load in the delivery vehicle, pallet information, damage to the load, and temperature information. In addition, the load quality conditions may be selected from a plurality of categories the may include a good load, a tipped or unstable pallet, an improperly stacked container, a pallet near an end of a delivery vehicle, a load against a door of a delivery vehicle, late delivery, a delivery vehicle making multiple deliveries, or cross-contamination of merchandise. In one form, these load conditions may be selected from a drop down menu on a customized web-based form. The report(s) may also include images of package with quality issues and/or of loading of packages in delivery vehicles. In other words, the package quality report(s) may include image(s) of a package with a condition from one of the group of conditions and/or image(s) of the interior of the delivery vehicle showing the loading and arrangement of the packages.

Accordingly, in one form, the system 100 may enable carriers 102 who deliver packages to consumers to create records in a database 120 and submit the records without requiring e-mails or spreadsheets, which results in a faster, more accessible, and more accurate method of reporting by carriers 102 of package quality (e.g., label presence/absence, label quality, re-tapes, re-packs, damage, etc.) being delivered from e-commerce locations. The system 100 may include a cloud-based database 120 configured to permit a user (e.g., carrier) to submit a web form for feedback to an e-commerce location. The system 100 may also provide an interface that enables a user at the e-commerce location to view a summary of the reporting entries, evaluate the entries for accuracy, and make corrections, if necessary. The system 100 may allow any carrier 102 with a direct link to submit reporting/feedback data without logging in, but may restrict the view/modify-based access to just those who have registered accounts. The web form and the feedback categorization aspects of the system are designed to enable individual ecommerce sites to easily identify trends in packaging, user process, vendor process, or the like, and to resolve issues.

Figure 2:
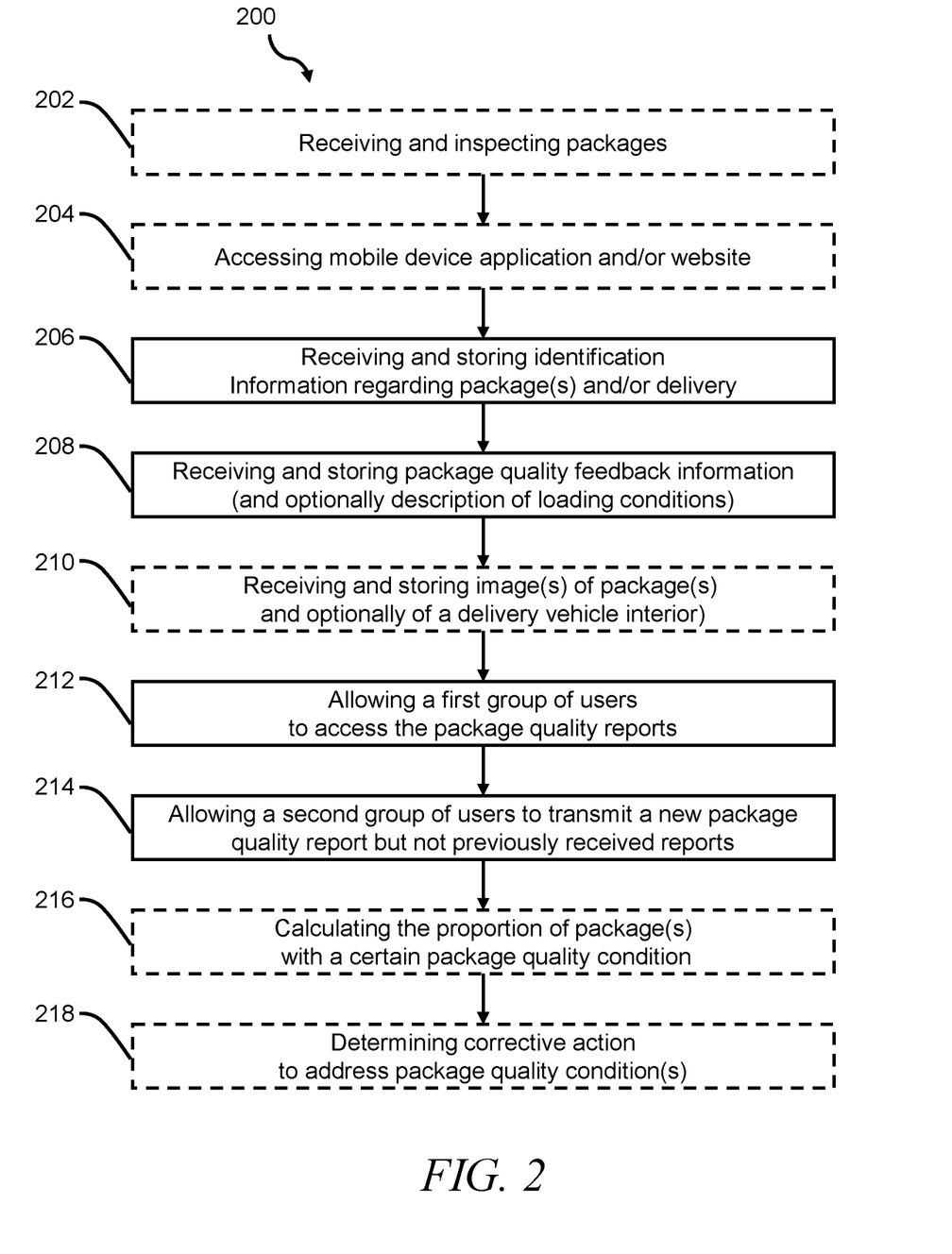
FIG. 2 is a flow diagram in accordance with some embodiments.

FIG. 2 shows a process 200 for receiving and using package quality reports. The process 200 may use some or all of the components of system 100. In one form, carriers may input information regarding the quality of packages they are picking up and transporting to customers and identifying issues with packing, labeling, etc. These package quality reports are transmitted to a database where they may be used to provide feedback and correct packaging quality issues.

At block 202, an individual/user may receive and inspect a group of packages, and this receipt and inspection may occur in several different contexts. For example, the individual may be (but need not be) a third party carrier that receives the packages at a retailer's distribution center/e-commerce facility. Additionally, however, the individual may be an employee of the retailer who picks up and delivers packages from the retailer's distribution center/e-commerce facility. Alternatively, the packages may be transported from a distribution center to a third party's package shipping center, where the packages may be received and inspected. Other approaches for receipt and inspection are also possible.

At block 204, the user may access a mobile device application and/or website to submit a package quality report. In one form, it is contemplated that the user may use a mobile device to transmit information regarding package quality issues of the group of packages being inspected. The user may input the package quality information on a customized web-based form that includes fields to indicate specific common types of package quality issues.

At block 206, identification information regarding the group of packages and/or regarding delivery may be received and stored. In one form, it is contemplated that a specific delivery route or identifier may be transmitted to be able to track the group of packages. It is also contemplated that this identification information may also be used to monitor and track the loading and arrangement of packages and merchandise in a delivery vehicle (although separate, additional identification information may also be transmitted). At this step, the identification information may relate solely to identifying the packages in some manner (source distribution center, carrier, etc.), and optionally, may also relate to load quality conditions on a delivery vehicle.

At block 208, package quality feedback information may be received and stored. The user may select a specific package quality issue from a group of common package quality issues (such as packages intended for different delivery vehicles, packages with missing labels, packages with damaged or unreadable labels, mislabeled or re-labeled packages, improperly taped or packed packages, and damaged packages). Optionally, in one form, it is also contemplated that the user may input a description of the loading conditions in a delivery vehicle. In other words, the package quality reports may include both package quality feedback information and load condition information (but it need not include load condition information).

At block 210, image(s) of package(s) may be received and stored. For example, a user may locate a package with a damaged label and may (or may not) need to take some action to correct the damaged label. The user may capture image(s) of the defective label and include them in the package quality report. As should be evident, image(s) often represent one of the best ways to memorialize a defect or other package quality issue. In one form, it is also contemplated that the user may (but need not) simultaneously capture image(s) of the load quality conditions in the interior of a delivery vehicle. For example, the user may use a camera in the user's mobile device to capture images of both packages (and package quality issues) and the interior of the delivery vehicle (and load quality issues).

At block 212, a first group of users is allowed to access the package quality reports that have been received and stored. In other words, this first group of users is provided with full access to the reports. It is generally contemplated that these users may be part of the retailer operating the distribution center/e-commerce facility that supplied the packages. For example, the users may be part of an e-commerce facility home office, who can log in to view summarized reporting and make corrections in their buildings, when necessary.

At block 214, a second group of users is allowed to transmit a new package quality report but not allowed access to previously received package quality reports. It is generally contemplated that some or all of this second group users may be third party carriers, who are unaffiliated with the retailer operating the distribution center/e-commerce facility supplying the packages. In other words, the second group of users may be limited to being allowed to provide feedback about the package quality issues that they experience.

At block 216, the proportion of package(s) with a certain package quality condition may be calculated. In other words, the frequency of the specific package quality issues (such as packing issues, labeling issues, etc.) may be calculated, which provides an understanding of which issues appear to be the most common. At block 218, correction action may be determined to address package quality condition(s). For example, the distribution center/e-commerce facility may determine that certain employees handling labeling may need to be re-trained in order to reduce the number of smudged or defective labels. As another example, packing processes within the distribution center/e-commerce facility may need be revised in order to seek to avoid defective packing issues that may be arising, if the distribution center/e-commerce facility can determine that a certain packing process may be causing these issues.

Figure 3:
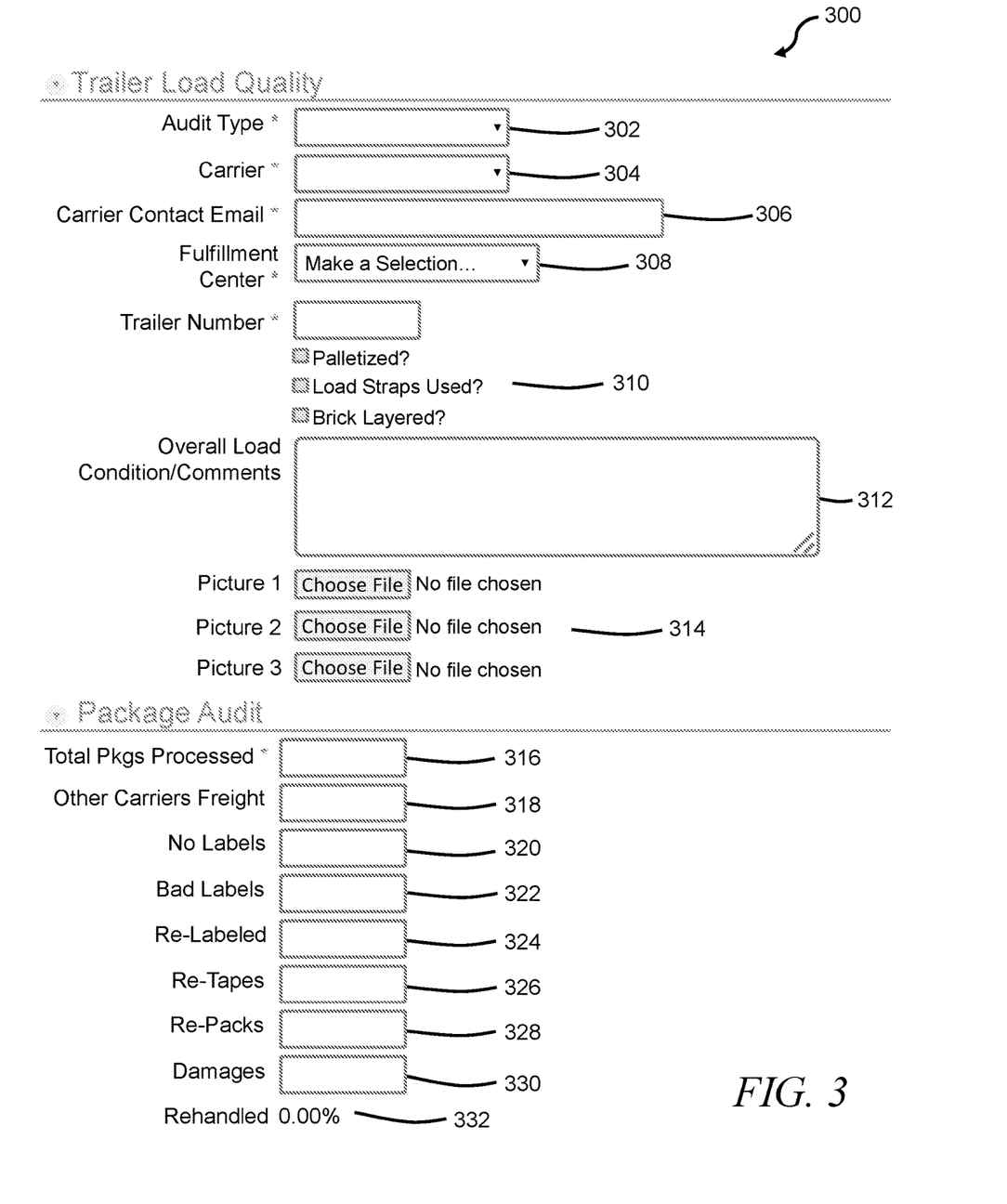
FIG. 3 is a block diagram in accordance with some embodiments.

FIG. 3 shows an example of a user-inputted customized feedback form 300. This example allows a user to input information regarding both the load quality of the delivery vehicle and the quality of the packages themselves that are being loaded. As can be seen, the form 300 includes a number of fields that may require the entry of text from a user or may require drop down menus with specific entries for selection by the user. This is just one example of a form with examples of some of the fields, but of course, many other possible forms and fields are possible (including, for example, another form that only includes package quality fields). In one embodiment, it is contemplated that the user may access an application that has been downloaded onto his mobile device. This downloaded application allows the user to access a website displaying the customized form 300 and allows the user to input the information in the fields of the customized form 300.

In this example, the top section of the form 300 is directed to load quality and load conditions. As can be seen, the form 300 includes fields directed to audit type 302 (audits may be scheduled at certain time intervals—such as every week—or may be submitted on an indefinite, ad hoc basis); the identity of the carrier 304 (such as, for example, UPS or FedEx); contact information for the carrier 306; the specific fulfillment center/distribution center/e-commerce facility 308 supplying the packages and merchandise; the trailer number/delivery identification number 310; carrier comments regarding the overall load condition 312; and a portion 314 for uploading one or more images showing the load conditions at the delivery vehicle. It is generally contemplated that many of these fields (other than the contact information 306, comments 312, and portion 314 for uploading images) will be drop down menus with a finite number of possible selections. Some of these entries (such as the identity of the specific fulfillment center/distribution center/e-commerce facility 308) may be looked up from external databases.

In this form 300, the bottom section is directed to package quality and package conditions. As can be seen, this example form 300 includes fields directed to the total number of packages being processed 316; other carrier's freight 318 (showing wrongly sorted shipments that should have gone to a different carrier); the total number of labels 320; the number of bad labels 322; the number of packages that are re-labeled 324; the packages requiring re-taping 326; the packages requiring re-packing 328; and the number of damaged packages 330. This bottom section allows carriers to itemize the total packages against individual problem areas. The percentage of cases requiring rehandling may be automatically calculated in the bottom field 332.

Figure 4:
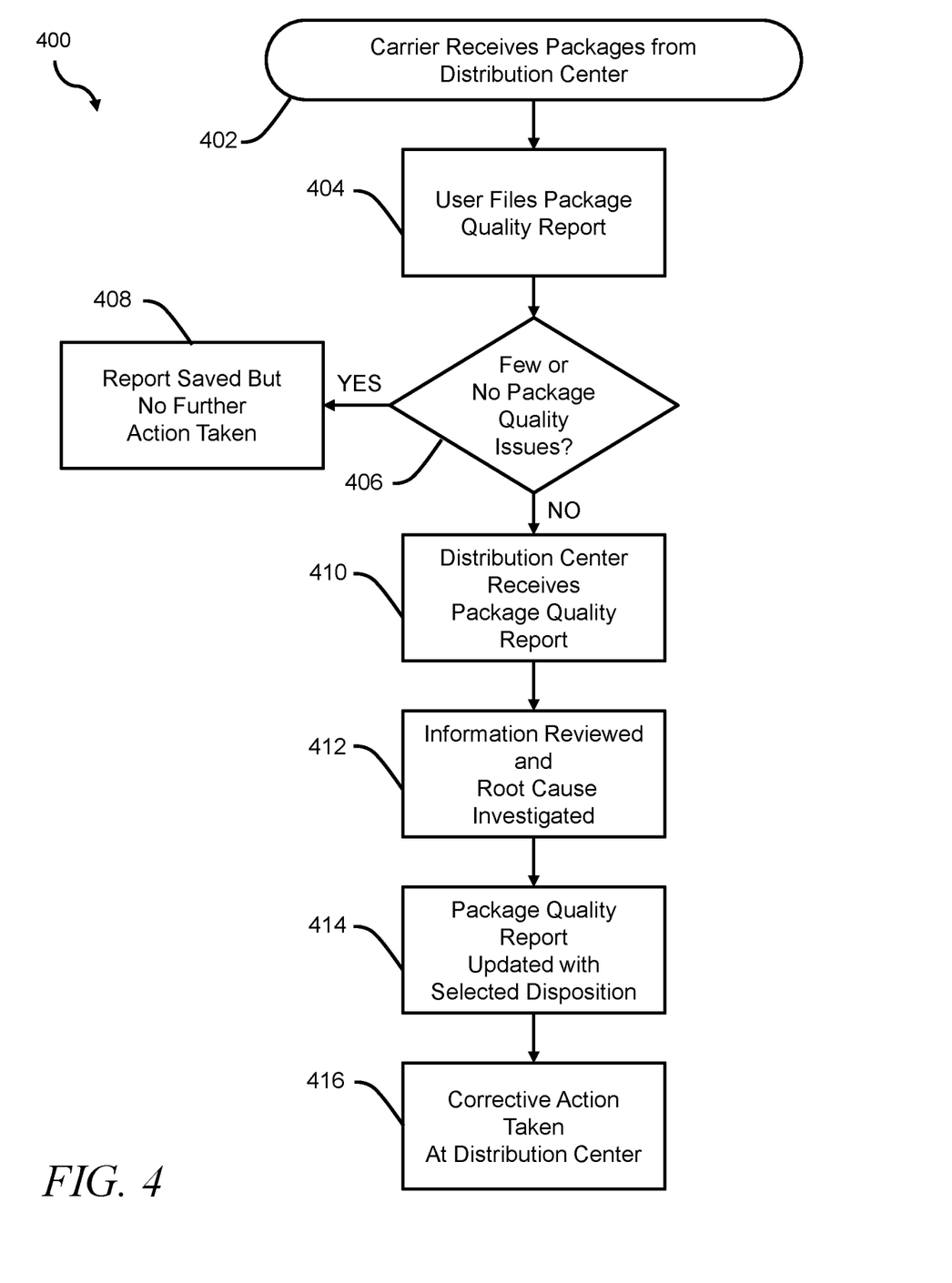
FIG. 4 is a flow diagram in accordance with some embodiments.

FIG. 4 shows an example of a process 400 for internal handling of a package quality report. As described above, a package quality report may be used to document and record logistic package quality feedback from a carrier to a distribution center/e-commerce facility. As shown at block 402, a carrier receives packages from a distribution center. Further, as shown at block 404, a user with a mobile device inspects the packages and merchandise and files a package quality report. In one form, it is contemplated that the user may also include load quality conditions regarding the loading and arrangement of packages and merchandise in a delivery vehicle. Further, in one form, the feedback may be initially provided to a central office or headquarters for consideration and may then be forwarded to any affected distribution centers. It is generally contemplated that these steps are accomplished in accordance with the processes and systems outlined above.

At block 406, a determination may be made as to whether the group of package(s) have no quality issues or have a low number of quality issues falling within an acceptable level. This determination may be made solely by the user conducting the inspection of the packages. It is also contemplated that this determination may be possibly made solely by a centralized quality control group or individual after reviewing the package quality report submitted by the user. Alternatively, this determination may be made based on some combination of inputs from the user and from the quality control group or individual.

As shown at block 408, if the determination is few (if any) package quality issues, the quality control record may be saved but no further action need be taken. Alternatively, positive feedback may be provided to responsible groups and individuals. This report may be included in a database as a portion of the overall data that may be evaluated for any trends of package quality over time. These trends may focus on package quality over time involving specific distribution centers, carriers, delivery routes and services, merchandise delivery types, and other factors. For example, it may be determined that over time a high proportion of instances of damage appear to arise from a particular distribution center. As another example, the report(s) may indicate a particular event affecting packaging quality, such as that merchandise on a particular shipment may have been damaged. This information may suggest that the retailer and distribution center need to do something differently.

At block 410, a determination has been made that the package quality issues were above a minimum threshold, and the source distribution center may receive the package quality report for further evaluation. The distribution center may retrieve the feedback electronically, and in fact, package quality information may be centralized, disseminated, and evaluated across multiple networks and recipients. At block 412, the information in the package quality report may be reviewed and the root cause of any package quality issues may be investigated. For example, an individual or group responsible for the distribution center operations and/or shipping may be tasked with the investigation.

As shown at block 414, in one form, once the investigation is completed, the package quality record may be updated with a selected disposition. For example, the customized form 300 may include an additional feedback field that is accessible to the investigating group or individual. Alternatively, this feedback field may be generated after filing of the package quality report. This field or fields may be in a format allowing for the entry of text and/or in a drop down menu format indicating various pre-approved possible disposition options.

At block 416, the selected disposition may be forwarded to or communicated to responsible individuals within the distribution center so as to lead to any appropriate corrective action. For example, depending on the nature of the conditions identified in the package quality report, training procedures may need to be reviewed, modified, or reinforced, such as appropriate labeling and packing procedures. Generally, the corrective action may relate to any factor involving the packaging.

As described with respect to block 404, the package quality report may optionally also include feedback regarding load quality conditions at a delivery vehicle. It is contemplated that the load quality feedback information may also be used in a manner similar to the package quality feedback information. In other words, in one form, load quality feedback information inputted by a user may also be considered and the following steps taken: determine if the number of load quality issues fall above a certain threshold (block 406), save a "good" report with no further action being taken (block 408), sending the affected distribution center the report identifying the load quality issues (block 410), investigating the cause of the load quality issues (block 412), updating the report with a disposition regarding particular load quality issues (block 414), and taking action to correct the reported load quality issues at the distribution center (block 416).

Figure 5:
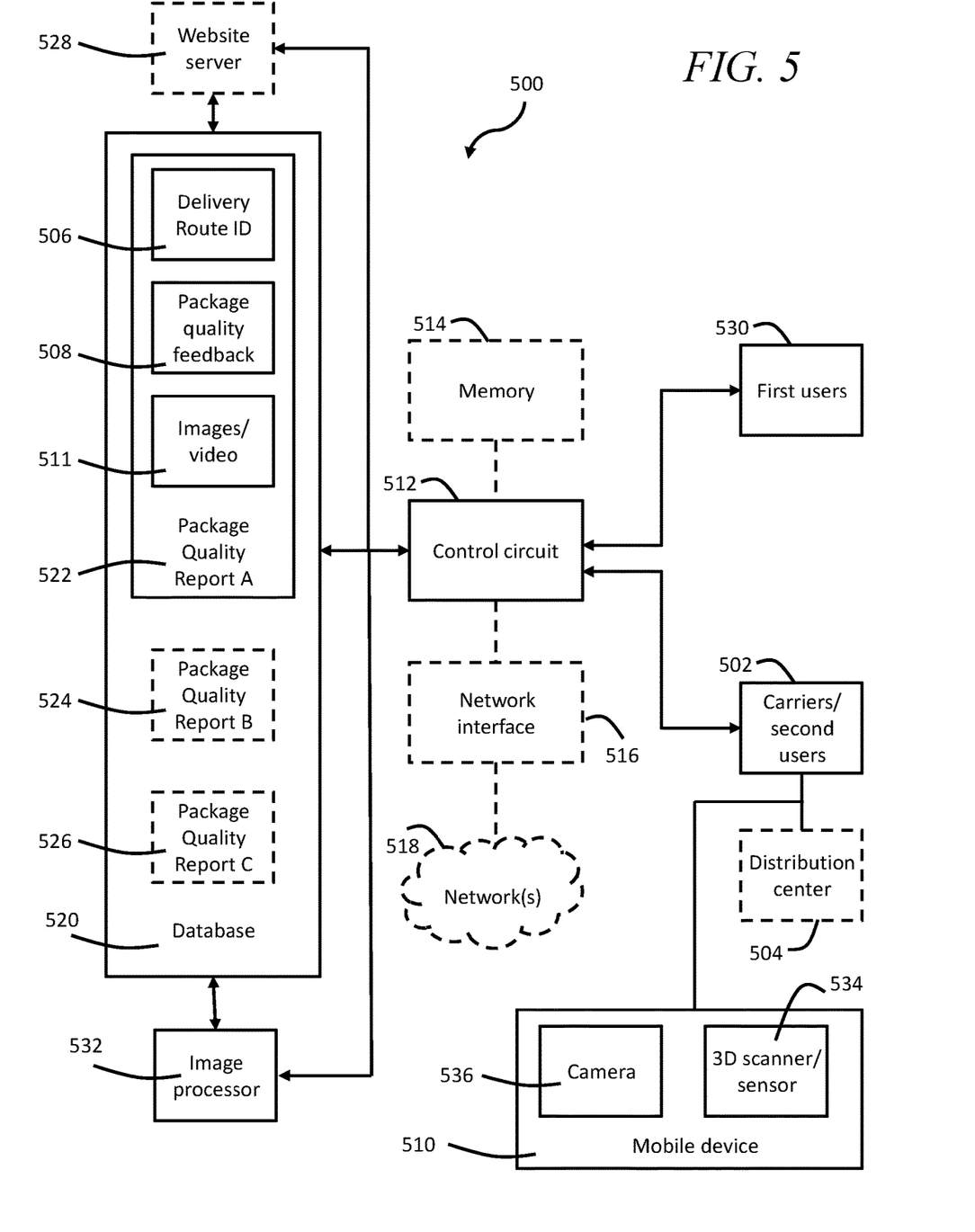
FIG. 5 is a block diagram in accordance with some embodiments.

Referring to FIG. 5, there is shown a block diagram illustrating components of another system 500. This system 500 is generally similar to system 100 described above, but it relies primarily on images of the packages (rather than user inputting based on visual observation) to determine package quality issues. More specifically, it is contemplated that package quality issues may be determined primarily from image(s) of the packages captured by a mobile device. Instead of manually inputting package quality issues (as addressed above), it is contemplated that the carriers may capture images of the packages, and the images may be processed and analyzed to determine quality issues and defects. In other words, in this form, image processing of the images alone may be used to determine package quality issues (rather than relying on the subjective evaluation of the carrier and the manual input of the package issues by the carrier). This approach may be used to check most conditions of packages automatically with computer vision and intelligence. In some forms, as described further below, this approach may involve the use virtual reality or augmented reality technology to determine some package quality issues.

Many of the components are the same as in system 100, which is incorporated into this description. Again, in one form, it is generally contemplated that packages may be picked up by carriers/second users 502 at a merchandise distribution center 504 or may be delivered from the distribution center 504 to a package shipping center. In this form, the carriers 502 may again transmit delivery route identification information 506 (so as to be able to identify and track the packages for which feedback is being provided). Again, it is contemplated that the carrier 502 may input and transmit this information using a mobile device 510. It is contemplated that any of various types of mobile devices may be used, such as smartphones and other portable computing devices (including MC40 handheld devices, tablets, laptops, headsets, etc.).

The system 500 also includes a control circuit 512 that generally controls the operation of the system 500. The architectural options for control circuits were described above with respect to system 100 and need not be repeated. Further, as described above, the control circuit 512 may be operably coupled to a memory 514 and may also be operably coupled to a network interface 516. In turn, this network interface 516 can compatibly communicate via whatever network or networks 518 may be appropriate and desired. Memories, communication networks, and network interfaces are well understood areas of prior art endeavor (were discussed above) and do not require further discussion.

Again, the system 500 includes a database 520 (coupled to the control circuit 512) that may receive and store the delivery identification information 506 and images 511. It is generally contemplated that the delivery identification information 506 and images 511 may be stored in a package quality report. Further, as described below, an image processor 532 analyzes and processes the images to determine package quality feedback 508, which is also stored in the package quality report. FIG. 5 specifically shows three package quality reports in the database 520 (Package Quality Report A (522), Package Quality Report B (524), Package Quality Report C (526)), but the database 520 will likely include many more package quality reports. Like control circuit 112 of system 100, the control circuit 512 may be in wireless communication with a website server 528, or central computing device, which may enable access to and communication with a database 520, which is remote from the mobile device 510.

Also as in system 100, it is contemplated that two different user groups will have different access rights to the package quality information in the database 520. More specifically, the control circuit 512 allows a first group of users 530 to generally access most or all of the package quality report(s) received and stored in the database 520. In contrast, the control circuit 512 allows a second group of users (i.e., third party carriers 502) to each transmit and store a new package quality report in the database 520 but not to have access to the other package quality report(s) previously received and stored in the database 520.

However, in contrast to system 100, in system 500, it is contemplated that the carrier 504 or user will utilize a mobile device 510 with certain imaging and sensing capabilities. More specifically, in one preferred form, the mobile device includes a depth sensor or 3D scanner 534 that can be used to map the package and determine if the package is damaged or deformed in some way, i.e., has holes or perforations, ripples, crunching, indentations, etc. These depth sensors and 3D scanners 534 can be used to perform point cloud mapping and measurements of the package to determine damage or deformity. Examples of computer vision technology that can be used to map surfaces of the packages to determine such packaging issues include Google Tango and Microsoft HoloLens technology. Optionally, under this approach, the sensed/scanned package data may be used to create and store a 3D model of the package, if desired.

The mobile device 510 also preferably includes a camera 536 or other optical sensor for capturing a sequence of still images or a short video of the package. It is generally contemplated that the depth sensor/3D scanner 534 and the camera 536 will be included in one single mobile device 510, but they may also be part of separate mobile devices 510. The camera 536 would preferably be used to capture images or video 511 showing the different sides and surfaces of the package. In other words, the user would take several pictures or even a short video clip walking around the package to try to ensure the detection of all package quality issues. In a preferred form, the camera 536 has sufficient color and darkness discrimination in order to detect dark areas of the package that may indicate moisture or leakage. As addressed further below, the images 511 captured by the camera 536 or other optical sensor would also be used to detect and identify labeling issues (missing labels, unreadable labels, etc.), such as through barcode scanning and optical character recognition of labels.

In one form, it is contemplated that the captured images 511 and sensor readings may be processed locally, i.e., they may be processed by the mobile device 511, or may be processed at the time of inspection. For example, the mobile device 511 and image processor 532 may form one unitary structure such that the image processing is performed at the mobile device 510. Alternatively, the mobile device 510 may be in wireless communication with a remote image processor 532 such that the image analysis can be performed at the time of inspection. One advantage of this approach is that package quality issues may be detected and identified right away, especially latent issues that may not be readily detectable, and possibly corrected immediately.

In another form, it is contemplated that the captured images 511 and sensor readings may be processed after the time of inspection. In this form, the captured images 511 and sensor readings may be analyzed by a remote image processor 532 after the images 511 are captured and sensor readings taken, and immediate feedback may not be provided to the carrier 504. Such an approach may be part of a systematic audit of packages that does not involve a visual inspection by the carrier 504 for package quality issues.

Under either approach, from the images 511, the image processor 532 may detect and identify various types of package quality issues. As addressed above, based on the depth sensing/3D scanning, the image processor 532 may detect and identify damage and deformity of the package from the sensor readings. Further, color and shading analysis of pixels may detect and identify leakage. Bar scanning and optical character recognition of text as applied to images 511 of the labels may detect and identify unreadable, incomplete, or damaged labels. Improper packing and/or improper/missing taping may be detected and identified by comparing images 511 showing packing/taping with database images showing correct manner of packaging, correct positioning of taping, etc.

After the image processor 532 completes this analysis, in one form, it may then auto-fill the package quality feedback section 508 of a package quality report 522. For example, it may auto-fill some or all of the categories shown in the package audit portion of FIG. 3 or in some other form. Again, the package quality reports 522 and the determination of packaging quality issues are designed to enable individual ecommerce sites and distribution centers to easily identify trends in packaging, user process, vendor process, or the like, and to resolve issues. Certain issues may be found to arise more frequently at specific ecommerce sites and distribution centers and may thereby suggest specific processes at those ecommerce sites and distribution centers requiring correction.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring quality of packages loaded onto vehicles for delivery to customers, the system comprising:
    a distribution center of a retailer configured to store merchandise, the distribution center providing different types of merchandise items to third party carriers;
    a plurality of merchandise items at the distribution center being arranged in packages for loading onto a delivery vehicle of a third party carrier for delivery to a plurality of customers;
    procedures of the distribution center regarding labeling, packing, and taping of packages;
    a mobile device configured for use by the third party carrier to:
        receive delivery route identification information identifying the delivery vehicle and the third party carrier delivering the packages;
        receive package quality feedback information identifying at least one package quality condition of at least one of the packages being transported by the delivery vehicle, the at least one package quality condition being selected from a plurality of predetermined categories including a package with a missing label, a package with a damaged or unreadable label, a mislabeled or re-labeled package, and an improperly taped or packed package;
        capture an image associated with the at least one package quality condition;
        the identification information, package quality feedback information, and image collectively constituting a package quality report;
    a control circuit configured to:
        receive real time feedback of the package quality feedback information and the image from the mobile device;
        determine that the at least one package quality condition violates one or more of the procedures regarding labeling, packing, and taping of packages based on the real time feedback;
        based on the real time feedback, instruct training or revision of labeling, packing, or taping procedures at the distribution center to avoid repetition of the at least one package quality condition for other packages at the distribution center for loading onto other delivery vehicles;

store the package quality report in a database, the database configured to receive a plurality of package quality reports corresponding to a plurality of deliveries;

allow a first predetermined group of users at the distribution center to access the plurality of package quality reports received and stored in the database;

allow a second predetermined group of users at the third party carrier to each transmit and store a new package quality report in the database but not to access the plurality of package quality reports previously received and stored in the database wherein the package quality report further comprises information regarding how the packages were loaded and arranged in the interior of the delivery vehicle.

2. The system of claim 1, wherein the database comprises a cloud-based database communicatively coupled to a website server configured to serve as a platform for the input of the identification information and package quality feedback information to the database.

3. The system of claim 2, wherein the website server is configured to be in wireless communication with a plurality of computing devices, each computing device used by one of the second predetermined group of users to input and transmit the identification information and package quality feedback information.

4. The system of claim 1, wherein:
the at least one package quality control report includes a total number of packages on a delivery vehicle and a number of packages with each of the least one package quality condition from the plurality of predetermined categories.

5. The system of claim 1, wherein:
the packages transported by each delivery vehicle are supplied by an e-commerce facility to a package shipping center for shipping to a customer.

6. The system of claim 5, wherein the control circuit is configured:
to transmit the package quality report to the e-commerce facility that supplied the packages that are the subject of the report to the package shipping center.

7. The system of claim 1, wherein information comprises at least one of load stacking, load packing, arrangement and location of the load in the delivery vehicle, pallet information, and damage to the load.

8. The system of claim 1, wherein the information comprises at least one load quality condition from a plurality of predetermined categories comprises a good load, a tipped or unstable pallet, an improperly stacked container, a pallet near an end of a delivery vehicle, a load against a door of a delivery vehicle, or cross- contamination of merchandise.

9. The system of claim 1, wherein the package quality report further comprises an image of the interior of the delivery vehicle showing loading and arrangement of the packages.

10. A method for monitoring quality of packages loaded onto vehicles for delivery to customers, the method comprising:
providing a distribution center of a retailer configured to store merchandise, the distribution center providing different types of merchandise items to third party carriers;
arranging a plurality of merchandise items at the distribution center in packages for loading onto a delivery vehicle of a third party carrier for delivery to a plurality of customers;
providing procedures of the distribution center regarding labeling, packing, and taping of packages;;
by a mobile device configured for use by the third party carrier:
receiving delivery route identification information identifying the delivery vehicle and the third party carrier delivering the packages;
receiving package quality feedback information identifying at least one package quality condition of at least one of the packages being transported by the delivery vehicle, the at least one package quality condition being selected from a plurality of predetermined categories including a package with a missing label, a package with a damaged or unreadable label, a mislabeled or re-labeled package, and an improperly taped or packed package;
capturing an image associated with the at least one package quality condition;
the identification information, package quality feedback information, and image collectively constituting a package quality report;
by a control circuit:
receiving real time feedback of the package quality feedback information and the image from the mobile device;
determining that the at least one package quality condition violates one or more of the procedures regarding labeling, packing, and taping of packages based on the real time feedback;
based on the real time feedback, instructing training or revision of labeling, packing, or taping procedures at the distribution center to avoid repetition of the at least one package quality condition for other packages at the distribution center for loading onto other delivery vehicles;
storing the package quality report in a database, the database configured to receive a plurality of package quality reports corresponding to a plurality of deliveries;
allowing a first predetermined group of users at the distribution center to access the plurality of package quality reports received and stored in the database;
allowing a second predetermined group of users at the third party carrier to each transmit and store a new package quality report in the database but not to access the plurality of package quality reports previously received and stored in the database;
wherein the package quality report further comprises information regarding how the packages were loaded and arranged in the interior of a delivery vehicle.

11. The method of claim 10, further comprising:
by the control circuit, calculating, for at least one delivery, the proportion of packages with each of the least one package quality condition from the plurality of predetermined categories to the total number of packages in the delivery.

12. The method of claim 10, further comprising:
supplying the packages to be transported by a delivery vehicle from an e-commerce facility to a package shipping center for shipping to a customer.

13. The method of claim 12, further comprising:
by the control circuit, transmitting the package quality report to the e-commerce facility that supplied the packages that are the subject of the report to the package shipping center.

14. The method of claim 10, wherein the package quality report further comprises an image of at least one of a package with a condition from one of the plurality of predetermined categories or the interior of the delivery vehicle showing loading and arrangement of the packages.

15. A system for monitoring quality of packages loaded onto vehicles for delivery to customers, the system comprising:
   a distribution center of a retailer configured to store merchandise, the distribution center providing different types of merchandise items to third party carriers;
   a plurality of merchandise items at the distribution center being arranged in a plurality of packages for loading onto a delivery vehicle of a third party carrier for delivery to a plurality of customers;
   at least one mobile device comprising a camera configured to capture images of the plurality of packages and a depth sensor or 3D scanner configured to capture surface readings of the plurality of packages;
   an image processor operatively coupled to the at least one mobile device, the image processor configured to identify damage and deformity of the plurality of packages based on the surface readings;
   procedures of the distribution center regarding labeling, packing, and taping of packages;
   the at least one mobile device configured for use by the third party carrier to
      receive delivery route identification information identifying the delivery vehicle and the third party carrier delivering the packages;
      receive package quality feedback information identifying at least one package quality condition of at least one of the packages being transported by the delivery vehicle, the at least one package quality condition being selected from a plurality of predetermined categories including a package with a missing label, a package with a damaged or unreadable label, a mislabeled or re-labeled package, and an improperly taped or packed package;
      capture an image and surface readings associated with the at least one package quality condition;
   the identification information, package quality feedback information, and image and surface readings collectively constituting a package quality report;
   a control circuit configured to:
      receive real time feedback of the package quality feedback information and the image and surface readings from the mobile device;
      determine that the at least one package quality condition violates one or more of the procedures regarding labeling, packing, and taping of packages based on the real time feedback;
      based on the real time feedback, instruct training or revision of labeling, packing, or taping procedures at the distribution center to avoid repetition of the at least one package quality condition for other packages at the distribution center for loading onto other delivery vehicles;
      store the package quality report in a database, the database configured to receive a plurality of package quality reports corresponding to a plurality of deliveries;
      allow a first predetermined group of users at the distribution center to access the plurality of package quality reports received and stored in the database;
      allow a second predetermined group of users at the third party carrier to each transmit and store a new package quality report in the database but not to access the plurality of package quality reports previously received and stored in the database.

* * * * *

UNITED STATES PATENT AND TRADEMARK OFFICE
CERTIFICATE OF CORRECTION

PATENT NO. : 11,151,679 B2
APPLICATION NO. : 15/820834
DATED : October 19, 2021
INVENTOR(S) : Andrew B. Millhouse and Steven J. Lewis It is certified that error appears in the above-identified patent and that said Letters Patent is hereby corrected as shown below:

On the Title Page
In Column 2, Item (56) under OTHER PUBLICATIONS, Line 1, delete "Pot;" and insert -- Pct; --

In the Claims
In Claim 8, Column 15, Line 52, delete "cross- contamination" and insert -- cross-contamination --
In Claim 10, Column 16, Line 2, delete "packages;;" and insert -- packages; --

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*